(12) United States Patent
Hao (10) Patent No.: US 10,442,284 B2
(45) Date of Patent: Oct. 15, 2019

(54) ELECTRO-HYDRAULIC HYBRID-POWER DRIVING SYSTEM

(71) Applicant: Suzhou eKontrol Drive Technology Co., Ltd, Suzhou (CN)

(72) Inventor: Qingjun Hao, Suzhou (CN)

(73) Assignee: EKONTROL DRIVE (SUZHOU) CO., LTD, Suzhou, Jiangsu Province (CN)

( * ) Notice: Subject to any disclaimer, the term of this patent is extended or adjusted under 35 U.S.C. 154(b) by 526 days.

(21) Appl. No.: 15/183,119

(22) Filed: Jun. 15, 2016

(65) Prior Publication Data

US 2017/0217298 A1   Aug. 3, 2017

(30) Foreign Application Priority Data

Feb. 2, 2016 (CN) .......................... 2016 1 0069949
Apr. 8, 2016 (CN) .......................... 2016 1 0217048

(51) Int. Cl.

| B60K 6/36 | (2007.10) |
|---|---|
| B60K 6/365 | (2007.10) |
| B60K 6/387 | (2007.10) |
| B60K 6/442 | (2007.10) |
| B60K 6/445 | (2007.10) |
| B60K 6/547 | (2007.10) |
| B60K 6/38 | (2007.10) |

(52) U.S. Cl.
CPC ................ *B60K 6/365* (2013.01); *B60K 6/36* (2013.01); *B60K 6/387* (2013.01); *B60K 6/442* (2013.01); *B60K 6/445* (2013.01); *B60K 6/547* (2013.01); *B60K 2006/381* (2013.01); *B60Y 2200/92* (2013.01); *B60Y 2400/73* (2013.01); *Y02T 10/6239* (2013.01)

(58) Field of Classification Search
CPC .......... B60K 6/365; B60K 6/547; F16H 3/006
See application file for complete search history.

(56) References Cited

U.S. PATENT DOCUMENTS

| 8,734,281 B2 * | 5/2014 | Ai .......................... B60K 6/445 180/65.21 |
|---|---|---|
| 2017/0167546 A1 * | 6/2017 | Satoi ...................... B60K 6/365 |
| 2017/0282702 A1 * | 10/2017 | Kim ........................ B60K 6/26 |

\* cited by examiner

*Primary Examiner* — Derek D Knight
(74) *Attorney, Agent, or Firm* — Locke Lord LLP; Tim Tingkang Xia, Esq.

(57) ABSTRACT

An electro-hydraulic hybrid-power driving system, comprising an engine, a first motor, a second motor, a first planetary gear set, a second planetary gear set, and a hydraulic control shift set that is connected to the engine. The first motor is axially connected to the engine, the second motor is axially connected to the first planetary gear set and the second planetary gear set, and the first planetary gear set is coaxially connected to the second planetary gear set. The hydraulic control shift set includes a first gear and a second gear, a dual wet clutch is disposed between the first gear and the second gear, and the first gear, the second gear, and the dual wet clutch are coaxially connected to the engine. The present invention by disposing a specific electro-hydraulic hybrid-power driving system, different working modes can be implemented according to different requirements.

13 Claims, 5 Drawing Sheets

ELECTRO-HYDRAULIC HYBRID-POWER DRIVING SYSTEM

RELATED APPLICATIONS

This application claims priority to Chinese Application Serial Number 201610217048.7, filed on Apr. 8, 2016 and 201610069949.6, filed on Feb. 2, 2016, which is incorporated by reference herein in its entirety.

TECHNICAL FIELD

The present invention relates to the field of driving technologies for new-energy automobiles, and more particularly to an electro-hydraulic hybrid-power driving system.

BACKGROUND

As new-energy technologies become increasingly mature on a daily basis, technical breakthroughs have been made for driving systems. At present, parallel and parallel-and-series hybrid power systems are used in mainstream new-energy models, and energy is efficiently used and recycled by means of analysis and distribution of characteristics and efficiency ranges of an engine and a motor, thereby improving efficiency of an entire system.

In the prior art, with the ongoing development of technologies, new-energy technologies have found increasingly wide use in the field of public facilities. Currently, in public vehicles such as snow plow trucks, an automated manual transmission (AMT) gearbox hybrid power system and an Integrated Starter Generator (ISG) hybrid power system are widely used. Although the AMT gearbox hybrid power system and the ISG hybrid power system can reduce fuel consumption, both of them have the following disadvantages:

(1) In an actual working condition of a vehicle, an engine cannot stably remain at a particular efficient working point in a working process, resulting in an increase in fuel consumption.

(2) The AMT gearbox hybrid power system and the ISG hybrid power system cannot satisfy a working condition requirement of a vehicle that is operated at an ultra-low speed, where the vehicle is, for example, a snow plow truck and a sprinkler truck.

(3) When the speed of a vehicle is less than 20 km/h, the vehicle is driven by a motor, and an engine is involved only when the vehicle reaches a particular speed, causing an insufficient hill start capability.

Therefore, how to effectively remedy the deficiencies in the prior art becomes a technical problem that needs to be resolved in the embodiments.

SUMMARY

An objective of the present invention is to overcome defects in the prior art, and an electro-hydraulic hybrid-power driving system is provided. A driving system having a specific structure is disposed; therefore, different working modes can be implemented according to requirements, so that stable operation at an ultra-low speed can be implemented, gears can be changed in a continuous manner, a high torque is provided, and a working requirement of a vehicle is satisfied.

To implement the foregoing objectives, the present invention proposes the following technical solutions: an electro-hydraulic hybrid-power driving system. The electro-hydraulic hybrid-power driving system includes an engine, a first motor, a second motor, a first planetary gear set, a second planetary gear set, and a hydraulic control shift set that is connected to the engine, where the first motor is axially connected to the engine, the second motor is axially connected to the first planetary gear set and the second planetary gear set, the first planetary gear set is coaxially connected to the second planetary gear set, the hydraulic control shift set includes a first gear and a second gear, a dual wet clutch is disposed between the first gear and the second gear, and the first gear, the second gear, and the dual wet clutch are coaxially connected to the engine.

Preferably, the first planetary gear set includes a first planetary carrier, a first planetary gear disposed on the first planetary carrier, and a first gear ring and a first sun gear that are engaged with the first planetary gear.

Preferably, a third gear and a fourth gear are disposed on the first gear ring, the third gear is engaged with the first gear, and the fourth gear is engaged with the second gear.

Preferably, the second planetary gear set includes a second planetary carrier, a second planetary gear disposed on the second planetary carrier, and a second gear ring and a second sun gear that are engaged with the second planetary gear.

Preferably, a first brake is disposed on an outer side of the second gear ring.

Preferably, the second sun gear is coaxially connected to a first sun gear, and the second planetary gear is connected to a first planetary gear by using a first planetary carrier.

Preferably, the second planetary carrier is fixedly connected to a fifth gear, the fifth gear is engaged with a sixth gear, and the sixth gear is fixedly connected to a wheel.

Preferably, a manner in which the first motor is axially connected to the engine is one manner selected from manners of a direct axial connection, a connection via a gear, and a connection via a planet row.

Preferably, a manner in which the second motor is axially connected to the first planetary gear set is one manner selected from manners of a direct axial connection, a connection via a gear, and a connection via a planet row.

Preferably, an outer diameter size of the first gear is greater than an outer diameter size of the second gear.

Preferably, an outer diameter size of the third gear is less than an outer diameter size of the fourth gear.

Preferably, an outer diameter size of the second sun gear is greater than an outer diameter size of the first sun gear.

Preferably, an outer diameter size of the second planetary gear is less than an outer diameter size of the first planetary gear.

For power of an engine in the present invention, by means of a combination between a dual wet clutch of a hydraulic control portion and a first gear or a second gear, power is transferred to a first gear ring of a first gear set, the first gear ring transfers power to a fifth gear via a first planetary gear and via a first planetary carrier, and power is eventually output to a wheel by using a sixth gear. A different connection manner may be selected for a second motor and a shaft connected to a sun gear to output power to a first sun gear or a second sun gear, and the sun gear eventually outputs power to the wheel via a planetary gear and a planetary carrier. A different connection manner may also be selected for a first motor and a shaft connected to the engine, and a direct axial connection, a connection via a gear or a connection via a planet row may be selected. The specific electro-hydraulic hybrid-power driving system of the present invention is used, so that different working requirements can be satisfied, and different working modes are implemented; the present invention is especially applicable to some special-type public vehicles, for example, snow plow trucks, and sprinkler trucks.

The present invention further has a function that can implement switching between a high speed and a low speed. That is, a dual wet clutch is combined with a first gear or a second gear, and a first brake (at this time, the brake is in a working state) is then combined, so that a power source can be switched from a second motor to an engine, to enable power coupling, thereby achieving high-speed driving.

Beneficial effects of the present invention are as follows:

1) An electro-hydraulic control gearbox is provided. At any car speed, by means of speed regulation control on a motor, it can be ensured that the engine is at a working point of optimal efficiency, thereby improving system efficiency.

2) Rotational speeds cover a wide range, an ultra-low speed driving function is provided, and the present invention is applicable to a special low-speed large-torque vehicle.

3) High flexibility is provided, working modes are varied, and the present invention is adaptable to various complex working conditions.

4) A fuel economy rate is relatively high, a price-performance ratio is relatively high, and the present invention has competitive advantageous in the market.

Reference numerals in the accompanying drawings: 1, engine; 2, first motor; 3, second motor; 4, first gear; 5, second gear; 6, dual wet clutch; 7, third gear; 8, fourth gear; 9, first gear ring; 10, first planetary gear; 11, first sun gear; 12, second planetary gear; 13, second sun gear; 14, second gear ring; 15, first brake; 16, first planetary carrier; 17, fifth gear; 18, sixth gear; 19, third gear ring; 20, third planetary gear; 21, third sun gear; 22, third planetary carrier; 23, second brake; 24, seventh gear; 25, eighth gear; 26, ninth gear; 27, tenth gear; 28, fourth gear ring; 29, fourth planetary gear; 30, fourth sun gear; 31, fourth planetary carrier; 32, third brake; 33, second planetary carrier.

DETAILED DESCRIPTION OF EMBODIMENTS

The technical solutions in the embodiments of the present invention are described below clearly and completely with reference to the accompanying drawings of the present invention.

Figure 1:
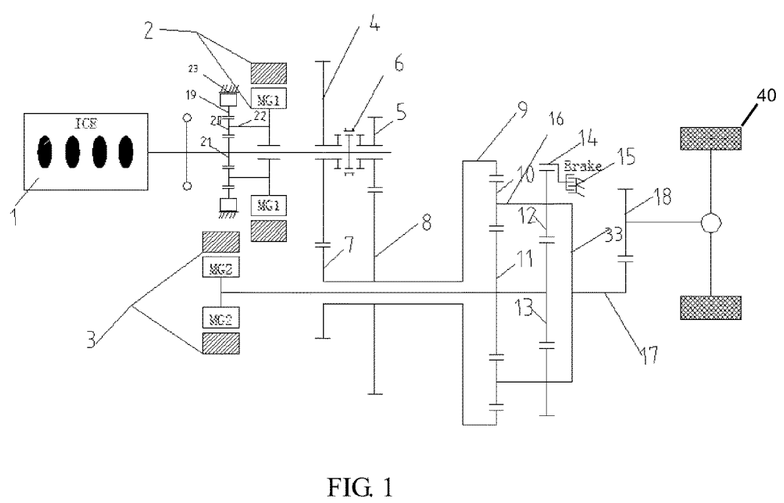
FIG. 1 is a schematic diagram of an electro-hydraulic hybrid-power driving system according to Embodiment 1 of the present invention.

As shown in FIG. 1, the present invention discloses an electro-hydraulic hybrid-power driving system, including an engine 1, a shock absorber coaxially connected to the engine 1, a first motor 2, a second motor 3, a hydraulic control shift set connected to the engine 1, and a first planetary gear set and a second planetary gear set. The first motor 2 is axially connected to the engine 1, the second motor 3 is axially connected to the first planetary gear set, and the first planetary gear set is coaxially connected to the second planetary gear set.

The hydraulic control shift set includes a first gear 4 and a second gear 5. The first gear 4 and the second gear 5 are sleeved over on a same shaft, an end of the shaft is connected to the engine 1, a dual wet clutch 6 is further disposed between the first gear 4 and the second gear 5, and the dual wet clutch 6 is coaxially connected to the engine 1. The first gear 4 forms a two-gear transmission system with the second gear 5 and the dual wet clutch 6. The dual wet clutch 6 implements combination with the first gear 4 and the second gear 5 by means of hydraulic control, thereby implementing gear changing. Because an outer diameter size of the first gear 4 is greater than an outer diameter size of the second gear 5, it may be selected according to requirements to output different transmission ratios.

The first planetary gear set includes a first gear ring 9, a first planetary gear 10, a first sun gear 11, and a first planetary carrier 16. The first planetary gear 10 is engaged with the first gear ring 9 and the first sun gear 11. A third gear 7 and a fourth gear 8 are further disposed on the first gear ring 9, the third gear 7 is engaged with the first gear 4, the fourth gear 8 is engaged with the second gear 5, and an outer diameter size of the third gear 7 is less than an outer diameter size of the fourth gear 8.

The second planetary gear set includes a second gear ring 14, a second planetary gear 12, a second sun gear 13, and a second planetary carrier 33. The second planetary gear 12 is engaged with the second gear ring 14 and the second sun gear 13. The first planetary carrier 16 is fixedly connected on the first planetary gear 10, the second planetary gear 12 is connected to the first planetary gear 10 by using a planetary carrier, and an outer diameter size of the first planetary gear 10 is less than an outer diameter size of the second planetary gear 12. The second planetary carrier 33 is connected to a fifth gear 17, a wheel 40 is fixedly connected to a sixth gear 18, and the fifth gear 17 is engaged with the sixth gear 18. Power is transferred to the fifth gear 17 via the second planetary carrier 33, and is then transferred to the sixth gear 18 via the fifth gear 17, so that eventually power is output to the wheel 40. Meanwhile, a first brake 15 is further disposed at an outer ring of the second gear ring 14, and the first brake 15 changes a motion state of the first gear ring 9 by means of combination or separation. The first sun gear 11 is coaxially connected to the second sun gear 13, an outer diameter size of the first sun gear 11 is greater than an outer diameter size of the second sun gear 13, and the first gear ring 9 is sleeved over on a shaft connected to the first sun gear 11 and the second sun gear 13.

The first motor 2 is connected to a shaft directly connected to the engine 1, the second motor 3 is connected to the shaft connected to the first sun gear 11 and the second sun gear 13, and together with the foregoing first planetary gear set, second planetary gear set, and hydraulic control shift set, an electro-hydraulic hybrid power driving system is formed, so that a user can select different working modes according to different requirements.

More preferably, multiple connection manners may be selected between the first motor 2 and the shaft directly connected to the engine 1, and include a direct axial connection, a connection via a gear, and a connection via a planet row. Similarly, multiple connection manners may also be selected between the second motor 3 and a shaft directly connected to a sun gear, and include a direct axial connection, a connection via a gear, and a connection via a planet row. Different connection manners have different implementation manners, which are described below in detail.

Embodiment 1

As shown in FIG. 1, a first motor 2 and a shaft directly connected to the engine 1 have a connection via a planet row. The planet row includes a third gear ring 19, a third planetary gear 20, a third sun gear 21, and a third planetary carrier 22. The engine 1 is coaxially connected to the third sun gear 21, the first motor 2 is sheathed on the shaft connected to the engine 1, the first motor 2 is connected to the third planetary gear 20 via the third planetary carrier 22, and the third planetary gear 20 is in engagement with the third sun gear 21 and the third gear ring 19. A second brake 23 is disposed at an outer ring of the third gear ring 19, and the second brake 23 controls a motion state of the third gear ring 19 by means of separation or combination.

A second motor 3 and a shaft directly connected to a sun gear have a direct axial connection. That is, the second motor 3 is coaxially connected to a first sun gear 11 and a second sun gear 13, and the second motor 3 directly transfers power to the first sun gear 11 or the second sun gear 13. In this connection manner, a traveling speed of a car can be directly controlled by controlling a rotational speed of the second motor 3. When the second motor 3 rotates at a low speed, the car travels slowly, and when the second motor 3 rotates at a high speed, the car travels faster. Because the second motor 3 has very high power and also has a very high torque at a low speed, acceleration of the car is very smooth. The car can be accelerated to a very high speed even with only the second motor 3, so that low-speed high-torque characteristics of the second motor 3 are fully used, so as to remedy an undesirable condition that the engine 1 has an insufficient torque at a low speed. When the second motor 3 has insufficient power, the engine 1 becomes involved. The first motor 2 and the engine have a connection via a planet row. After an instruction to start the engine is sent, the first motor 2 can rapidly and smoothly start the engine 1. The entire process has no interruptions, and transmission efficiency is very high. After the engine 1 is started, the planet row can be controlled by using a brake, to enable the first motor 2 to generate power, and a part of power of the engine 1 may also be supplied to a wheel, to remedy a defect of insufficient power.

The first motor 2 and the second motor 3 are integrated with a first planetary gear set, a second planetary gear set, and a hydraulic control shift set, so that a system volume can be effectively reduced. Meanwhile, the second motor 3 and a shaft directly connected to the first sun gear have a direct axial connection, so that a radial distance is minimum, integration becomes easier, a volume after the motor and the engine are integrated can be smaller, and a cost is lower.

Working Modes:

1) Pure-electric working mode: In this case, the engine 1 is static, the second motor 3 is in a working state, and a dual wet clutch 6 is in a neutral-gear state. That is, the dual wet clutch 6 is not combined with a first gear 4 or a second gear 5. When the second motor 3 is working, a second gear ring 14 is in engagement with a second planetary gear 12 and the second sun gear 13, either of which requires to be in a static state for transfer of power, and the second gear ring 14 is locked by using a first brake 15 disposed on an outer side of the second gear ring 14. Because the second motor 3 is coaxially connected to the first and second sun gears directly, power is directly transferred to the second sun gear 13. The second sun gear 13 is in engagement with the second planetary gear 12, and therefore power is transferred to the second planetary gear 12, and the second planetary gear 12 transfers power to a fifth gear 17 via a second planetary carrier 33. The fifth gear 17 is engaged with a sixth gear 18, and eventually power is output to the wheel 40 via the sixth gear 18. In this process, an outer diameter size of the second sun gear 13 is less than an outer diameter size of the first sun gear 11, and an outer diameter size of the fifth gear 17 is less than an outer diameter size of the sixth gear 18; therefore, the entire process is a uniform deceleration motion, so that a vehicle can travel remaining at a low speed, thereby providing a relatively high torque to the vehicle, and in another aspect, reducing the load of a decelerator of the vehicle.

2) Engine working mode: In this case, the engine 1 is working, the second motor 3 is in a braking state to ensure that the first sun gear 11 is static, the dual wet clutch is combined with the first gear 4 or the second gear 5, and the first brake 15 is released. When the engine 1 is working, in this case, the second brake 23 is released. Because none of the third gear ring 19, the third planetary gear 20, and the third sun gear 21 is fixed, there is no transmission. Therefore, the engine 1 transfers power to the first gear 4 or the second gear 5, a third gear 7 or a fourth gear 8 outputs and transfers power to a first gear ring 9, the first gear ring 9 transfers power to a first planetary gear 10, the first planetary gear 10 transfers power to the fifth gear 17 via a first planetary carrier, the fifth gear 17 is engaged with the sixth gear 18, and eventually power is output to the wheel 40 via the sixth gear 18.

3) Serial-and-parallel driving mode: In this case, the engine 1 and the second motor 3 are working, and the first brake 15 and the second brake 23 are not working. That is, the first brake 15 is separated from the second gear ring 14, and the second brake 23 is separated from the third gear ring 19. The dual wet clutch is combined with the first gear 4 or the second gear 5. The engine 1 transfers power to the first gear 4 or the second gear 5, the third gear 7 or the fourth gear 8 outputs and transfers power to the first gear ring 9, and the second motor 3 transfers power to the first sun gear 11. Next, the first gear ring 9 and the first sun gear 11 are coupled, so that the first planetary gear 10 outputs and transfers power to the fifth gear 17 via the first planetary carrier 16, the fifth gear 17 is engaged with the sixth gear 18, and eventually power is output to the wheel 40 via the sixth gear 18.

4) Serial connection driving mode: In this case, the engine 1 is working, the first brake 15 is braked, and the second gear ring 14 is locked. The second motor 3 directly transfers power to the second sun gear 13. The second sun gear 13 is engaged with the second planetary gear 12 and transfers power to the second planetary gear 12, the second planetary gear 12 outputs and transfers power to the fifth gear 17 via the first planetary carrier 16, the fifth gear 17 is engaged with the sixth gear 18, and eventually outputs power to the wheel 40. Meanwhile, the dual wet clutch is in a neutral-gear state, the second brake 23 is working, and the third gear ring 19 is locked. The engine 1 transfers power to the third sun gear, the third planetary carrier 22 has two ends, in which the two ends of the third planetary carrier 22 are fixedly connected to the third planetary gear 20 and the second motor 3 respectively. Therefore, the third sun gear 21 transfers power to the third planetary carrier 22 via the third planetary gear 20, and eventually transfers power to the second motor 3 to start power generation.

5) Engine 1 starting mode: In this case, the first motor 2 is working, the engine 1 is static, the dual wet clutch 6 is in a neutral-gear state, the second brake 23 is in a working state, and the third gear ring 19 is locked. The first motor 2 transfers power to the third planetary gear 20 via the third planetary carrier 22, the third planetary gear 20 is engaged with the third sun gear 21, and the third sun gear 21 outputs and transfers power to the engine 1, thereby implementing start of the engine 1. The planet row has advantages such as desirable smoothness and high output power. The first motor 2 and the engine 1 are connected via a planet row. After a start instruction is sent, the first motor 2 instantaneously starts and actuates the engine 1 to start, and the entire process is rapid and smooth.

Embodiment 2

Figure 2:
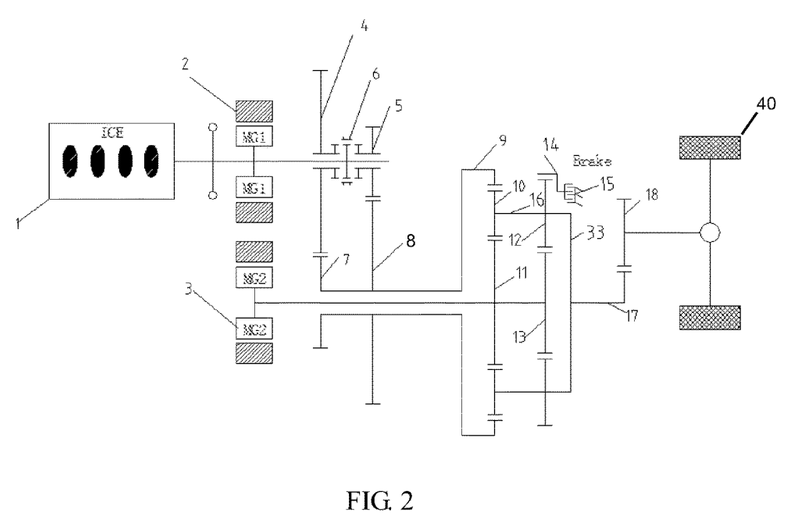
FIG. 2 is a schematic diagram of an electro-hydraulic hybrid-power driving system according to Embodiment 2 of the present invention.

As shown in FIG. 2, a first motor 2 and a shaft directly connected to an engine 1 have a direct axial connection, that is, the first motor 2 is coaxially connected to the engine 1. In this connection manner, rapid start of the engine 1 can be implemented. While the engine 1 is working, the first motor 2 is driven to generate power, and the first motor 2 outputs electric power to a second motor 3, so as to ensure that the second motor 3 has sufficient electric power to work, thereby increasing coupling power, and reducing fuel consumption when the engine 1 is working.

The second motor 3 and a shaft directly connected to a sun gear have a direct axial connection, that is, the second motor 3 is coaxially connected to the sun gear, and the second motor 3 is on a same shaft as a first sun gear 11 and a second sun gear 13.

In this connection manner, a traveling speed of a car can be directly controlled by controlling a rotational speed of the second motor 3. When the second motor 3 rotates at a low speed, the car travels slowly, and when the second motor 3 rotates at a high speed, the car travels faster. Because the second motor 3 has very high power and also has a very high torque at a low speed, acceleration of the car is very smooth. The car can be accelerated to a very high speed even with only the second motor 3, so that low-speed high-torque characteristics of the second motor 3 are fully used, so as to remedy an undesirable condition that the engine 1 has an insufficient torque at a low speed. When the second motor 3 has insufficient power, the engine 1 becomes involved. The first motor 2 and the engine 1 are connected via a planet row. After an instruction to start the engine is sent, the first motor 2 can rapidly and smoothly start the engine 1. The entire process has no interruptions, and transmission efficiency is very high. After the engine 1 is started, via a planetary gear set, the engine 1 enables the first motor 2 to generate power, and meanwhile, a part of power is supplied to a wheel, to remedy a defect of insufficient power. This connection manner has advantages such as easy installation and a small radial length, so that integration becomes easier, and a volume after the engine and motor are integrated can be very small.

Working Modes:

1) Pure-electric driving mode: Same as the pure-electric driving mode in Embodiment 1.

2) Engine driving mode: In this case, the engine 1 is working, the second motor 3 is in a braking state to ensure that the first sun gear 11 is static, a dual wet clutch is combined with a first gear 4 or a second gear 5, and a first brake 15 is released. When the engine 1 is working, the engine 1 transfers power to the first gear 4 or the second gear 5, a third gear 7 or a fourth gear 8 outputs and transfers power to a first gear ring 9, the first gear ring 9 transfers power to a first planetary gear 10, the first planetary gear 10 transfers power to a fifth gear 17 via a first planetary carrier 16, the fifth gear 17 is engaged with a sixth gear 18, and eventually power is output to the wheel 40 via the sixth gear 18.

3) Serial-and-parallel driving mode: In this case, the engine 1 is working, and the first brake 15 is not working, that is, the first brake 15 is separated from a second gear ring 14. The dual wet clutch 6 is combined with the first gear 4 or the second gear 5. The engine 1 transfers power to the first gear 4 or the second gear 5, the third gear 7 or the fourth gear 8 outputs and transfers power to the first gear ring 9, and the second motor 3 transfers power to the first sun gear 11. Next, the first gear ring 9 and the first sun gear 11 are coupled, so that the first planetary gear 10 outputs and transfers power to the fifth gear 17 via the first planetary carrier 16, the fifth gear 17 is engaged with the sixth gear 18, and eventually power is output to the wheel 40 by using the sixth gear 18.

4) Serial connection driving mode: In this case, the engine 1 is working, the second motor 3 is working, the first brake 15 is working, the second gear ring 14 is locked, and the dual wet clutch 6 is in a neutral-gear state. The second motor 3 directly transfers power to the second sun gear 13, the second sun gear 13 transfers power to a second planetary gear 12, and the second planetary gear 12 transfers power to the fifth gear 17 via a second planetary carrier 33. The fifth gear 17 is engaged with the sixth gear 18, and eventually power is output and transferred to the wheel 40; meanwhile, because the engine 1 is coaxially connected to the first motor 2, the engine 1 directly transfers power to the first motor 2, thereby starting power generation.

5) Engine 1 starting mode: The first motor 2 is in a working state, and the dual wet clutch 6 is in a neutral-gear state, that is, the dual wet clutch 6 is in a state of being separate from the first gear 4 or the second gear 5. The first motor 2 is coaxially connected to the engine 1, and the first motor 2 directly transfers power to the engine 1, thereby implementing start of the engine 1.

Embodiment 3

Figure 3:
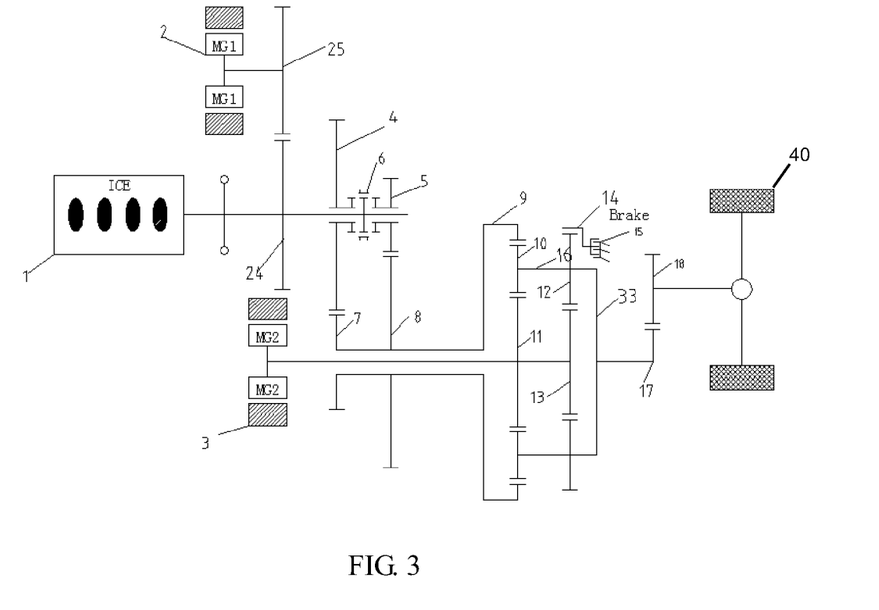
FIG. 3 is a schematic diagram of an electro-hydraulic hybrid-power driving system according to Embodiment 3 of the present invention.

As shown in FIG. 3, a first motor 2 and a shaft directly connected to an engine 1 have a connection via a gear. That is, the first motor 2 is fixedly connected to an eighth gear 25, the engine 1 is coaxially connected to a seventh gear 24, and the seventh gear 24 is engaged with the eighth gear 25. The engine 1, the seventh gear 24, a first gear 4, a second gear 5, and a dual wet clutch 6 are on a same shaft. The first motor 2 is connected, by using a gear, to the shaft connected to the engine, and provides output relying on a speed ratio by using gears having different sizes, so that a particular deceleration effect can be provided, to enable the engine 1 to match conveying power provided by a second motor 3, thereby increasing transmission power. When the engine 1 is started, a relatively slow rotational speed may be used to rapidly start the engine 1.

The second motor 3 and a shaft directly connected to a sun gear have a direct axial connection. That is, the second motor 3 is coaxially connected to the sun gear, and the second motor 3 is on a same shaft as a first sun gear 11 and a second sun gear 13.

Working Modes:

1) Pure-electric driving mode: Same as the pure-electric driving mode in Embodiment 1.

2) Engine 1 driving mode: In this case, the engine 1 is working, the second motor 3 is in a braking state to ensure that the first sun gear 11 is static, the dual wet clutch is combined with the first gear 4 or the second gear 5, and a first brake 15 is released. When the engine 1 is working, the engine 1 transfers power to the first gear 4 or the second gear 5, a third gear 7 or a fourth gear 8 outputs and transfers power to a first gear ring 9, the first gear ring 9 transfers power to a first planetary gear 10, the first planetary gear 10 transfers power to a fifth gear 17 via a first planetary carrier, the fifth gear 17 is engaged with a sixth gear 18, and eventually power is output to a wheel 40 by using the sixth gear 18.

3) Serial-and-parallel driving mode: In this case, the engine 1 and the second motor 3 are working, and the dual wet clutch 6 is combined with the first gear 4 or the second gear 5. The engine 1 transfers power to the first gear 4 or the second gear 5, and the third gear 7 or the fourth gear 8 outputs and transfers power to the first gear ring 9. In this case, the first brake 15 is not working, and the second motor 3 transfers power to the first sun gear 11. Next, the first gear ring 9 and the first sun gear 11 are coupled, so that the first planetary gear 10 outputs and transfers power to the fifth gear 17 via the first planetary carrier, and the sixth gear 18 outputs and transfers power to the wheel 40.

4) Serial connection driving mode: In this case, the engine 1 is working, the first brake 15 is braked, and a second gear ring 14 is locked. The second motor 3 transfers power to the second sun gear 13, power is then output and transferred to the fifth gear 17 via a second planetary gear 12 by using a planetary carrier, and the sixth gear 18 outputs and transfers power to the wheel 40. Meanwhile, the dual wet clutch 6 is in a neutral-gear state, the engine 1 is transferred to the seventh gear 24, the seventh gear 24 is engaged with the eighth gear 25, and the eighth gear 25 then outputs and transfers power to the first motor 2 to start power generation.

5) Engine 1 starting mode: In this case, the first motor 2 is working, the engine 1 is static, and the dual wet clutch 6 is in a neutral-gear state. The first motor 2 transfers power to the eighth gear 25, the eighth gear 25 is engaged with the seventh gear 24, and the seventh gear 24 then outputs and transfers power to the engine 1, thereby implementing start of the engine 1.

Embodiment 4

Figure 4:
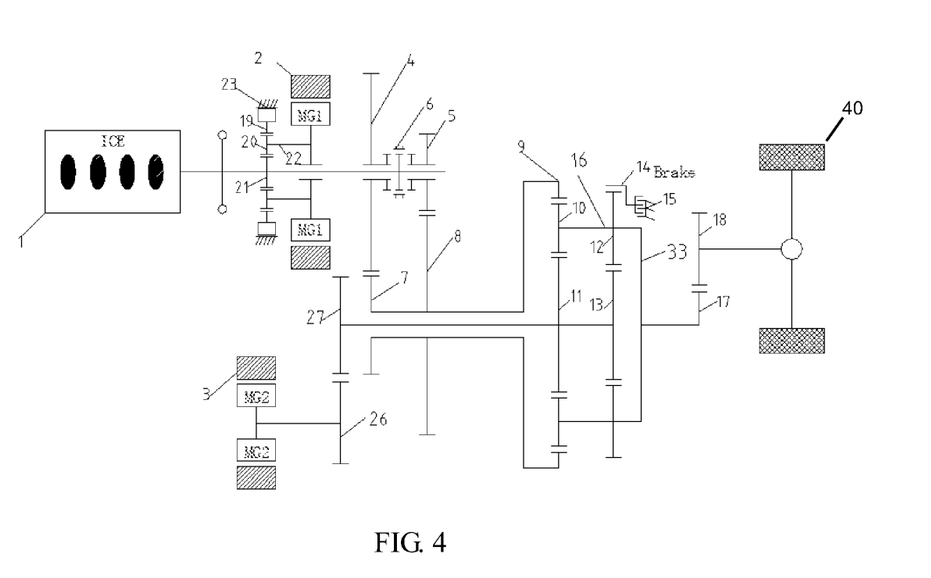
FIG. 4 is a schematic diagram of an electro-hydraulic hybrid-power driving system according to Embodiment 4 of the present invention.

As shown in FIG. 4, a first motor 2 and a shaft directly connected to an engine 1 have a connection via a planet row. The planet row includes a third gear ring 19, a third planetary gear 20, a third sun gear 21, and a third planetary carrier 22. The engine 1 is coaxially connected to the third sun gear 21, the first motor 2 is sheathed on the shaft connected to the engine 1, the first motor 2 is connected to the third planetary gear 20 via the third planetary carrier 22, and the third planetary gear 20 is in engagement with the third sun gear 21 and the third gear ring 19. A second brake 23 is disposed at an outer ring of the third gear ring 19, and the second brake 23 controls a motion state of the third gear ring 19 by means of separation or combination. In this connection manner, after an instruction to start the engine 1 is sent, the first motor 2 can rapidly and smoothly start the engine 1. The entire process has no interruptions, and transmission efficiency is very high.

A second motor 3 and a shaft directly connected to a sun gear have a connection via a gear. The second motor 3 is fixedly connected to a ninth gear 26, a tenth gear 27 is fixedly connected to the shaft directly connected to the sun gear, and the ninth gear 26 is engaged with the tenth gear 27. The tenth gear 27, a first sun gear, and a second sun gear 13 are on a same shaft. In this connection manner, output is provided relying on a speed ratio by using gears having different sizes, so that a particular deceleration effect can be provided, to enable the engine 1 to match conveying power provided by the first motor 2.

The second motor 3 is integrated with a first gear set and a second gear set, and a system volume can be reduced similarly.

Working Modes:

1) Pure-electric driving mode: In this case, the engine 1 is static, a dual wet clutch 6 is also in a neutral-gear state, a first brake 15 is working, and a second gear ring 14 is locked. The second motor 3 transfers power to the ninth gear 26, the tenth gear 27 outputs and transfers power to the second sun gear 13, the second sun gear 13 transfers power to a second planetary gear 12, the second planetary gear 12 transfers power to a fifth gear 17 via a first planetary carrier 16, and a sixth gear 18 then outputs and transfers power to a wheel 40.

2) Engine 1 driving mode: Same as the engine 1 driving mode in Embodiment 1.

3) Serial-and-parallel driving mode: In this case, the engine 1 and the second motor 3 are working, the first brake 15 and the second brake 23 are not working, and the dual wet clutch is combined with a first gear 4 or the second gear 5. The engine 1 transfers power to the first gear 4 or the second gear 5, and a third gear 7 or a fourth gear 8 outputs and transfers power to a first gear ring 9. The second motor 3 transfers power to the ninth gear 26, and the tenth gear 27 then transfers power to the first sun gear 11. Next, the first gear ring 9 and the first sun gear 11 are coupled, so that a first planetary gear 10 outputs and transfers power to the fifth gear 17 via the first planetary carrier, the fifth gear 17 is engaged with the sixth gear 18, and eventually power is output to the wheel 40 by using the sixth gear 18.

4) Serial connection driving mode: In this case, the engine 1 is working, the first brake 15 is working, and the second gear ring 14 is locked. The second motor 3 transfers power to the ninth gear 26, the tenth gear 27 outputs and transfers power to the second sun gear 13, power is then output and transferred to the fifth gear 17 via the second planetary gear 12 by using a planetary carrier, the fifth gear 17 is engaged with the sixth gear 18, and eventually power is output to the wheel 40. Meanwhile, the dual wet clutch is in a neutral-gear state, the second brake 23 is working, the third gear ring 19 is locked, the engine 1 transfers power to the third sun gear 21, and power is output to the first motor 2 via the third planetary gear 20 by using the third planetary carrier, thereby starting power generation.

5) Engine 1 starting mode: Same as the engine 1 starting mode in Embodiment 1.

Embodiment 5

Figure 5:
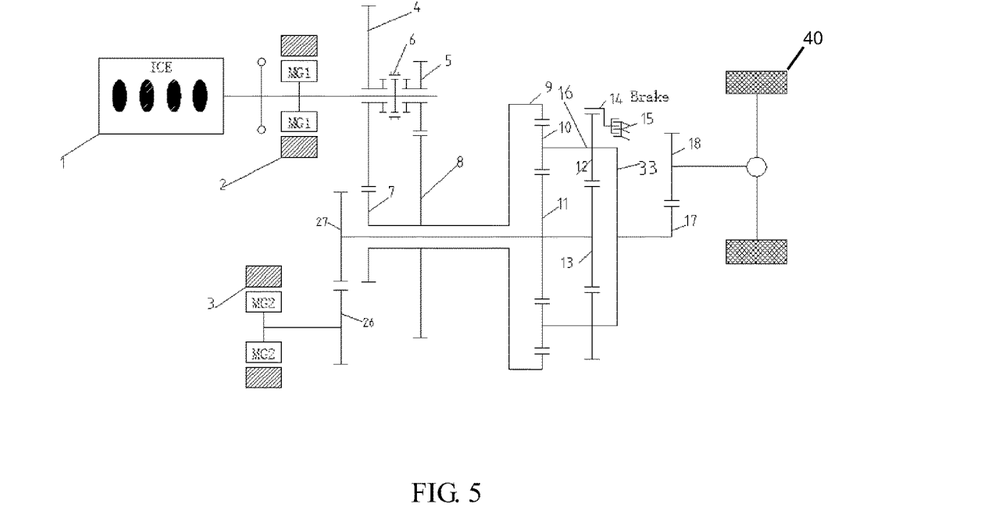
FIG. 5 is a schematic diagram of an electro-hydraulic hybrid-power driving system according to Embodiment 5 of the present invention.

As shown in FIG. 5, a first motor 2 and a shaft directly connected to an engine 1 have a direct axial connection, and the first motor 2 is coaxially connected to the engine 1. In this connection manner, rapidly start of the engine 1 can be implemented. While the engine 1 is working, the first motor is driven to generate power, and the first motor 2 outputs electric power to a second motor 3, to ensure that the second motor 3 has sufficient electric power to work, thereby increasing couple power, and reducing fuel consumption when the engine 1 is working.

The second motor 3 and a shaft directly connected to a sun gear have a connection via a gear. The second motor 3 is fixedly connected to a ninth gear 26, a tenth gear 27 is fixedly connected to the shaft directly connected to the sun gear, and the ninth gear 26 is engaged with the tenth gear 27. The tenth gear 27, a first sun gear 11, and a second sun gear 13 are on a same shaft.

Working Modes:

1) Pure-electric driving mode: Same as the pure-electric driving mode in Embodiment 4.

2) Engine driving mode: Same as the engine driving mode in Embodiment 2.

3) Serial-and-parallel driving mode: In this case, the engine 1 and the second motor 3 are working, a first brake 15 is not working, and a dual wet clutch is combined with the first gear 4 or a second gear 5. The engine 1 transfers power to the first gear 4 or the second gear 5, a third gear 7 or a fourth gear 8 outputs and transfers power to a first gear ring 9, the second motor 3 transfers power to the ninth gear 26, and the tenth gear 27 then transfers power to the first sun gear 11. Next, the first gear ring 9 and the first sun gear 11 are coupled, so that the first planetary gear 10 outputs and transfers power to a fifth gear 17 by using a first planetary carrier 16, the fifth gear 17 is engaged with a sixth gear 18, and eventually power is output to a wheel 40 by using the sixth gear 18.

4) Serial connection driving mode: In this case, the engine 1 is working, the second motor 3 is working, the first brake 15 is working, a second gear ring 14 is locked, and the dual wet clutch 6 is in a neutral-gear state. The second motor 3 transfers power to the ninth gear 26, the tenth gear 27 then transfers power to the second sun gear 13, the second sun gear 13 transfers power to a second planetary gear 12, and the second planetary gear 12 transfers power to the fifth gear 17 by using a second planetary carrier 33. The fifth gear 17 is engaged with the sixth gear 18, and eventually power is output and transferred to the wheel 40. Meanwhile, because the engine 1 is coaxially connected to the first motor 2, the engine 1 directly transfers power to the first motor 2, thereby starting power generation.

Engine 1 starting mode: Same as the engine 1 starting mode in Embodiment 2.

Embodiment 6

Figure 6:
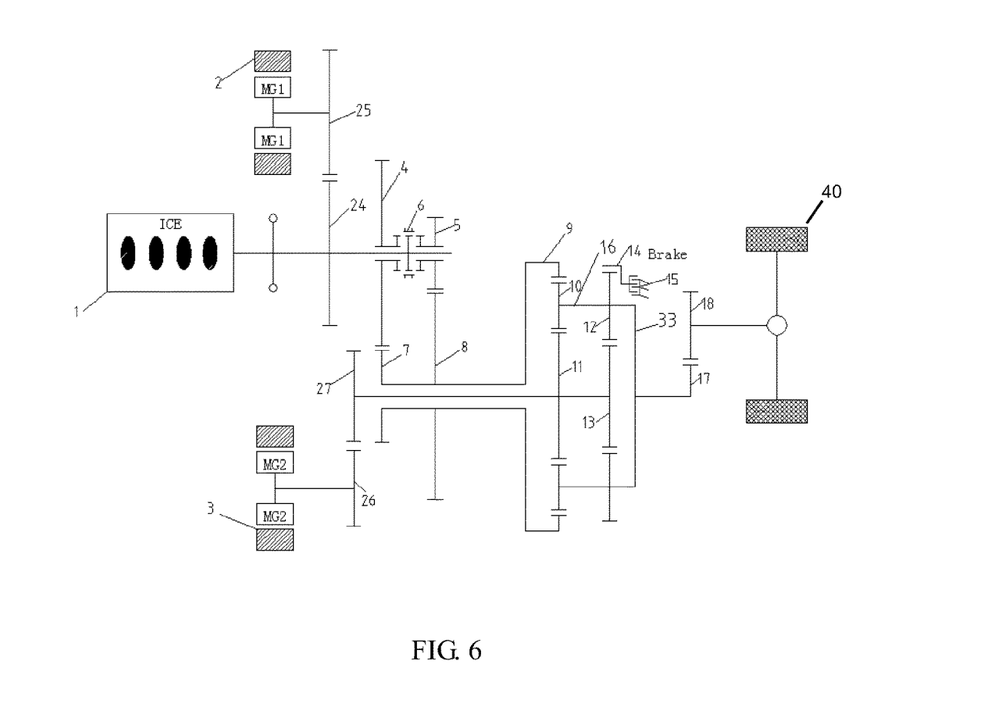
FIG. 6 is a schematic diagram of an electro-hydraulic hybrid-power driving system according to Embodiment 6 of the present invention.

As shown in FIG. 6, a first motor 2 and a shaft directly connected to an engine 1 have connection via a gear. The first motor 2 is fixedly connected to an eighth gear 25, the engine 1 is coaxially connected to a seventh gear 24, and the seventh gear 24 is engaged with the eighth gear 25. The engine 1, the seventh gear 24, a first gear 4, a second gear 5, and a dual wet clutch 6 are on a same shaft.

A second motor 3 and a shaft directly connected to a sun gear have a connection via a gear. The second motor 3 is fixedly connected to a ninth gear 26, a tenth gear 27 is fixedly connected to the shaft directly connected to the sun gear, and the ninth gear 26 is engaged with the tenth gear 27. The tenth gear 27, a first sun gear 11, and a second sun gear 13 are on a same shaft.

The first motor 2 and the second motor 3 are respectively connected to a shaft by using a gear. For a connection via a gear, output is provided relying on a speed ratio by using gears having different sizes, and a characteristic of power output is step output, so that a relatively high torque can be supported. A two-gear mode of a high gear and a low gear is the most economic choice under the premise of ensuring an output effect.

Working Modes:

1) Pure-electric driving mode: Same as the pure-electric driving mode in Embodiment 4.

2) engine 1 working mode: Same as the engine 1 working mode in Embodiment 3.

3) Serial-and-parallel driving mode: In this case, the engine 1 and the second motor 3 are working, and the dual wet clutch 6 is combined with the first gear 4 or the second gear 5. The engine 1 transfers power to the first gear 4 or the second gear 5, and a third gear 7 or a fourth gear 8 outputs and transfers power to a first gear ring 9. In this case, a first brake 15 is not working, the second motor 3 transfers power to the ninth gear 26, and the tenth gear 27 outputs and transfers power to the first sun gear 11. Next, the first gear ring 9 and the first sun gear 11 are coupled, so that a first planetary gear 10 outputs and transfers power to a fifth gear 17 by using a first planetary carrier 16, and a sixth gear 18 outputs and transfers power to a wheel 40.

4) Serial connection driving mode: In this case, the engine 1 is working, the first brake 15 is braked, and a second gear ring 14 is locked. The second motor 3 transfers power to the ninth gear 26, the tenth gear 27 outputs and transfers power to the second sun gear 13, power is then output and transferred to the fifth gear 17 via a second planetary gear 12 by using a planetary carrier, and the sixth gear 18 outputs and transfers power to the wheel 40. Meanwhile, the dual wet clutch 6 is in a neutral-gear state, the engine 1 transfers power to the seventh gear 24, the seventh gear 24 is engaged with the eighth gear 25, and the eighth gear 25 then outputs and transfers power to the second motor 3 to start power generation.

5) Engine 1 starting mode: Same as the engine 1 starting mode in Embodiment 3.

Embodiment 7

Figure 7:
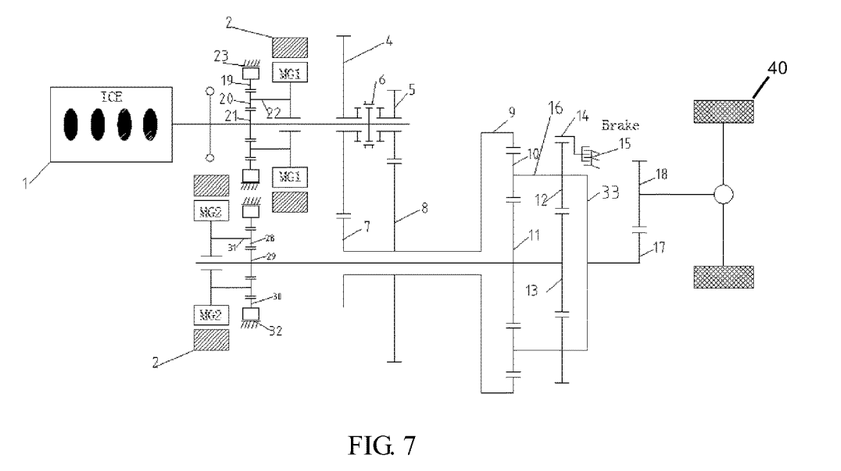
FIG. 7 is a schematic diagram of an electro-hydraulic hybrid-power driving system according to Embodiment 7 of the present invention.

As shown in FIG. 7, a first motor 2 and a shaft directly connected to an engine 1 have a connection via a planet row. The planet row includes a third gear ring 19, a third planetary gear 20, a third sun gear 21, and a third planetary carrier 22. The engine 1 is coaxially connected to the third sun gear 21, the first motor 2 is sheathed on the shaft connected to the engine 1, the first motor 2 is connected to the third planetary gear 20 by using the third planetary carrier 22, and the third planetary gear 20 is in engagement with the third sun gear 21 and the third gear ring 19. A second brake 23 is disposed at an outer ring of the third gear ring 19, and the second brake 23 controls a motion state of the third gear ring 19 by means of separation or combination.

A second motor 3 and a shaft connected to a first sun gear have a connection via a planet row. The planet row includes a fourth gear ring 28, a fourth planetary gear 29, a fourth sun gear 30, and a fourth planetary carrier 31. The fourth sun gear 30 and the shaft directly connected to the first sun gear 11 and a second sun gear 13 have a coaxial connection. The fourth planetary gear 29 is in engagement with the fourth sun gear 30 and the fourth gear ring 28. The fourth planetary carrier 31 has two ends, in which one end is fixedly connected to the second motor 3, and the other end is fixedly connected to the fourth planetary gear 29. A third brake 32 is disposed at an outer ring of the fourth gear ring 28, and the third brake 32 controls the motion state of the third gear ring 19 by means of separation or combination.

The first motor 2 and the shaft directly connected to the engine 1 have a connection via a planet row. This connection may provide an optimal deceleration effect. Meanwhile, by using a connection via a planetary gear, when the engine 1 is started, the first motor 2 may rapidly and stably start the engine 1, and a torque requirement on the first motor 2 is very little. The second motor 3 and the shaft connected to the first sun gear 11 have a connection via a planet row. When a vehicle starts, desirable smoothness is achieved, and transmission efficiency of the planetary gear is very high. By means of speed regulation control on the second motor 3, it can be ensured that the engine 1 remains at a working point of optimal efficiency, thereby improving system efficiency.

Working Modes:

1) Pure-electric driving mode: The second motor 3 is working. In this case, the third brake 32 is working, and the fourth gear ring 28 is locked. In this case, a first brake 15 is working, a second gear ring 14 is locked, the second motor 3 transfers power to the fourth planetary gear 29 by using the fourth planetary carrier 31, the fourth sun gear 30 transfers power to the second sun gear 13, the second sun gear 13 transfers power to a second planetary gear 12, the second planetary gear 12 transfers power to a fifth gear 17 by using a first planetary carrier 16, the fifth gear 17 is engaged with a sixth gear 18, and the sixth gear 18 outputs power to a wheel 40.

2) Engine 1 driving mode: Same as the engine 1 driving mode in Embodiment 1.

3) Serial-and-parallel driving mode: The engine 1 is working, the second motor 3 is working, the first brake 15 is not working, the second brake 23 is not working, a dual wet clutch 6 is combined with a first gear 4 or a second gear 5, the engine 1 transfers power to the first gear 4 or the second gear 5, and a third gear 7 or a fourth gear 8 outputs and transfers power to a first gear ring 9. Meanwhile, the third brake 32 is working, the fourth gear ring 28 is locked, the second motor 3 transfers power to the fourth planetary gear 29 by using the fourth planetary carrier, and transfers power to the first sun gear 11 by using the fourth sun gear 30. The first sun gear 11 and the first gear ring 9 are coupled, so that power is transferred to the fifth gear 17 via a first planetary gear 10 by using a planetary carrier, the fifth gear 17 and the sixth gear 18 are engaged, and power is eventually output to the wheel 40 by using the sixth gear 18.

4) Serial connection driving mode: The third brake 32 is working, the fourth gear ring 28 is locked, the first brake 15 is also working, and the second gear ring 14 is also locked. The second motor 3 transfers power to the fourth planetary gear 29 by using the planetary carrier, the fourth sun gear 30 transfers power to the second sun gear 13, power is transferred to the fifth gear 17 via the second planetary gear 12 by using a second planetary carrier 33, the fifth gear 17 is engaged with the sixth gear 18, and the sixth gear 18 outputs power to the wheel 40. Meanwhile, the second brake 23 is working, the third gear ring 19 is locked, the engine 1 transfers power to the third planetary gear 20 by using the third sun gear 21, and transfers power to the first motor 2 by using the planetary carrier, thereby starting power generation.

5) Engine 1 starting mode: Same as the engine 1 starting mode in Embodiment 1.

Embodiment 8

Figure 8:
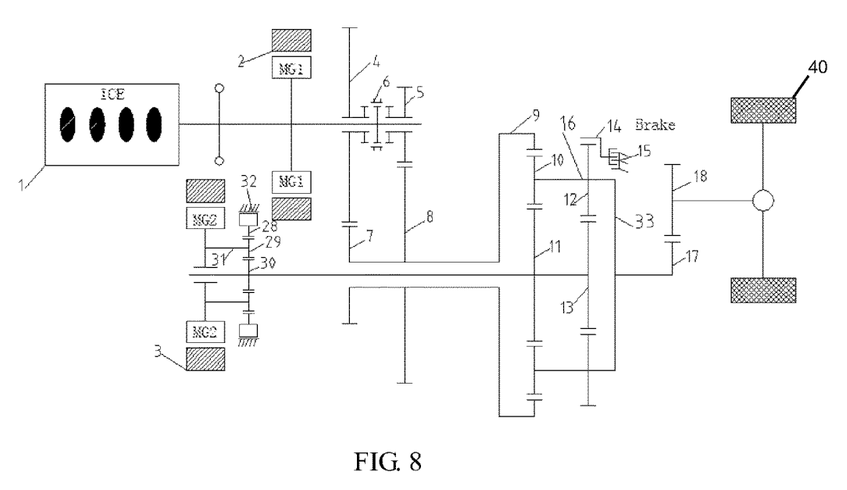
FIG. 8 is a schematic diagram of an electro-hydraulic hybrid-power driving system according to Embodiment 8 of the present invention.

As shown in FIG. 8, a first motor 2 is coaxially connected to an engine 1.

A second motor 3 and shaft directly connected to a first sun gear have a connection via a planet row. The planet row includes a fourth gear ring 28, a fourth planetary gear 29, a fourth sun gear 30, and a fourth planetary carrier 31. The fourth sun gear 30 and the shaft directly connected to the first sun gear 11 and a second sun gear 13 have a coaxial connection. The fourth planetary gear 29 is in engagement with the fourth sun gear 30 and the fourth gear ring 28. The fourth planetary carrier 31 has two ends, in which one end is fixedly connected to the second motor 3, and the other end is fixedly connected to the fourth planetary gear 29. A third brake 32 is disposed at an outer ring of the fourth gear ring 28, and the third brake 32 controls a motion state of a third gear ring 19 by means of separation or combination.

In this connection manner, when a car starts, the second motor 3 outputs power to a wheel by using the planet row, so that stable and rapid start can be implemented. Meanwhile, when power is insufficient, the engine is linvolved. A part of power is output to the wheel, and a part of power is directly output to the first motor 2 coaxially connected to the engine, so that the first motor 2 is started to generate power. The first motor 2 outputs electric power to the second motor 3, thereby effectively reducing fuel consumption.

Working Modes:

1) Pure-electric driving mode: Same as the pure-electric driving mode in Embodiment 7.

2) Engine driving mode: Same as the engine driving mode in Embodiment 2.

3) Serial-and-parallel driving mode: The engine 1 is working, the second motor 3 is working, a first brake 15 is not working, and a dual wet clutch 6 is combined with a first gear 4 or the second gear 5. The engine 1 transfers power to the first gear 4 or the second gear 5. A third gear 7 or a fourth gear 8 outputs and transfers power to a first gear ring 9. Meanwhile, the third brake 32 is working, the fourth gear ring 28 is locked, the second motor 3 transfers power to the fourth planetary gear 29 by using the fourth planetary carrier, and transfers power to the first sun gear 11 by using the fourth sun gear 30. The first sun gear 11 and the first gear ring 9 are coupled, and power is transferred to the fifth gear 17 via a first planetary gear 10 by using a first planetary carrier 16. The fifth gear 17 and a sixth gear 18 are engaged, and eventually power is output to the wheel 40 by using the sixth gear 18.

4) Serial connection driving mode: The third brake 32 is working, the fourth gear ring 28 is locked, the first brake 15 is also working, and a second gear ring 14 is also locked. The second motor 3 transfers power to the fourth planetary gear 29 by using the fourth planetary carrier, and the fourth sun gear 30 transfers power to the second sun gear 13, and transfers power to the fifth gear 17 via a second planetary gear 12 by using a second planetary carrier 33. The fifth gear 17 is engaged with the sixth gear 18, and the sixth gear 18 outputs power to the wheel 40. Meanwhile, the first motor 2 is coaxially connected to the engine 1, and during rotation, the engine 1 actuates the first motor 2 to rotate, thereby starting power generation.

5) Engine 1 starting mode: Same as the engine 1 starting mode in Embodiment 2.

Embodiment 9

Figure 9:
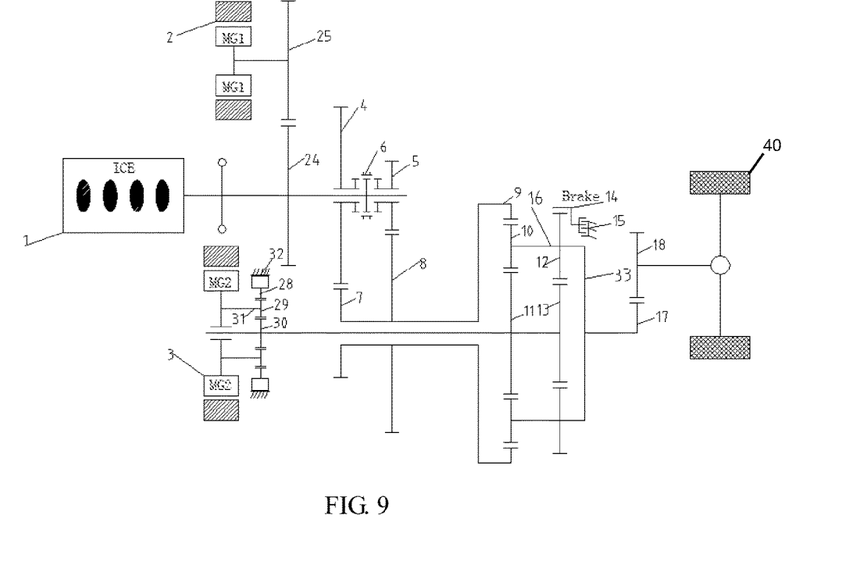
FIG. 9 is a schematic diagram of an electro-hydraulic hybrid-power driving system according to Embodiment 9 of the present invention.

As shown in FIG. 9, a first motor 2 and a shaft directly connected to an engine 1 have a connection via a gear. The first motor 2 is fixedly connected to an eighth gear 25, the engine 1 is coaxially connected to a seventh gear 24, and the seventh gear 24 is engaged with the eighth gear 25. The engine 1, the seventh gear 24, a first gear 4, a second gear 5, and a dual wet clutch 6 are on a same shaft.

A second motor 3 and a shaft directly connected to a sun gear have a connection via a planet row. The planet row includes a fourth gear ring 28, a fourth planetary gear 29, a fourth sun gear 30, and a fourth planetary carrier 31. The fourth sun gear 30 and the shaft directly connected to a first sun gear 11 and a second sun gear 13 have a coaxial connection. The fourth planetary gear 29 is in engagement with the fourth sun gear 30 and the fourth gear ring 28. The fourth planetary carrier 31 has two ends, in which one end is fixedly connected to the second motor 3, and the other end is fixedly connected to the fourth planetary gear 29. A third brake 32 is disposed at an outer ring of the fourth gear ring 28, and the third brake 32 controls a motion state of a third gear ring 19 by means of separation or combination.

In the foregoing connection manner, when a car starts, the second motor 3 outputs power to a wheel by using the planet row, so that stable and rapid start can be implemented. Rotational speeds of the second motor 3 cover a relatively wide range, an ultra-low-speed driving function is provided, and the present invention is applicable to a low-speed high-torque special vehicle. The first motor 2 is connected to the engine 1 via a gear. For a connection via a gear, output is provided relying on a speed ratio by using gears having different sizes, so that a particular deceleration effect can be provided, to enable the engine 1 to match transmission power provided by the second motor 3.

A shock absorber is integrated with the first motor 2, the second motor 3, a first gear set, a second gear set, and a hydraulic control shift set, so that a system volume can be effectively reduced. Similarly, the second motor 3 may be replaced with two small motors, which are installed on an outer side of the fourth planetary gear 29, so that the system volume is reduced to a certain degree.

Working Modes:

1) Pure-electric driving mode: Same as the pure-electric driving mode in Embodiment 7.

2) Engine 1 driving mode: Same as the engine 1 driving mode in Embodiment 3.

3) Serial-and-parallel driving mode: In this case, the engine 1 and the second motor 3 are working, and the dual wet clutch 6 is combined with a first gear 4 or a second gear 5. The engine 1 transfers power to the first gear 4 or the second gear 5, and a third gear 7 or a fourth gear 8 outputs and transfers power to a first gear ring 9. In this case, a first brake 15 is not working, the third brake 32 is working, and the fourth gear ring 28 is locked. The second motor 3 transfers power to the fourth planetary gear 29 by using the fourth planetary carrier, and transfers power to the first sun gear 11 by using the fourth sun gear 30. The first gear ring 9 and the first sun gear 11 are coupled, so that a first planetary gear 10 outputs and transfers power to a fifth gear 17 by using a planetary carrier, and a sixth gear 18 outputs and transfers power to the wheel 40.

4) Serial connection driving mode: The third brake 32 is working, the fourth gear ring 28 is locked, the first brake 15 is also working, and a second gear ring 14 is also locked. The second motor 3 transfers power to the fourth planetary gear 29 by using the planetary carrier, and transfers power to the second sun gear 13 by using the fourth sun gear 30. The second sun gear 13 transfers power to a second planetary gear 12, and the second planetary gear 12 transfers power to the fifth gear 17 by using a second planetary carrier 33. The fifth gear 17 is engaged with the sixth gear 18, and the sixth gear 18 outputs power to the wheel 40. Meanwhile, the dual wet clutch 6 is in a neutral-gear state, the engine 1 transfers power to the seventh gear 24, the seventh gear 24 is engaged with the eighth gear 25, and the eighth gear 25 then outputs and transfers power to the first motor 2 to start power generation.

5) Engine 1 starting mode: Same as the engine 1 starting mode in Embodiment 3.

For the present invention, a connection manner between a first motor 2 and an engine 1 is changed, and a connection manner between a second motor 3 and a sun gear is changed, so that the present invention has high flexibility and varied working modes and is adaptable to various complex cases. The first motor 2 is directly axially connected to a shaft directly connected to the engine 1, or the second motor 3 is directly axially connected to a shaft connected to a first sun gear 11, so that installation is easy, a radial length is small, and an area can be reduced; especially, for Embodiment 2, the area can be minimized. The first motor 2 is connected, via a gear, to the shaft connected to the engine 1, or the second motor 3 is connected, via a gear, to the shaft connected to the sun gear, so that a particular deceleration effect can be provided, to enable the engine 1 to match conveying power provided by the first motor 2 or the second motor 3. The first motor 2 or the second motor 3 uses a connection via a planet row, so that an optimal deceleration effect can be provided, and at the same time a torque requirement on the first motor 2 or the second motor 3 is very little; only a high-speed motor is required, and a cost is relatively low. By means of combinations of different structures, the structural layout can be more reasonable, so as to satisfy different requirements. Meanwhile, the present invention uses a dual wet clutch 6 to change gears, thereby implementing continuous change of gears without any interruption.

The technical content and technical features of the present invention are disclosed above; however, a person skilled in the art may still make various replacements and modifications without departing from the present invention based on the teaching and disclosure of the present invention. Therefore, the protection scope of the present invention should not be limited to the content disclosed in the embodiments, and should include various replacements and modifications that do not depart from the present invention and shall fall within the claims of the patent application.

The invention claimed is:

1. An electro-hydraulic hybrid-power driving system, comprising an engine, a first motor, a second motor, a first planetary gear set, a second planetary gear set, and a hydraulic control shift set that is connected to the engine, wherein the first motor is axially connected to the engine, the second motor is axially connected to the first planetary gear set and the second planetary gear set, the first planetary gear set is coaxially connected to the second planetary gear set, the hydraulic control shift set comprises a first gear and a second gear, a dual wet clutch is disposed between the first gear and the second gear, and the first gear, the second gear, and the dual wet clutch are coaxially connected to the engine.

2. The electro-hydraulic hybrid-power driving system according to claim 1, wherein the first planetary gear set comprises a first planetary carrier, a first planetary gear disposed on the first planetary carrier, and a first gear ring and a first sun gear that are engaged with the first planetary gear.

3. The electro-hydraulic hybrid-power driving system according to claim 2, wherein a third gear and a fourth gear are disposed on the first gear ring, the third gear is engaged with the first gear, and the fourth gear is engaged with the second gear.

4. The electro-hydraulic hybrid-power driving system according to claim 1, wherein the second planetary gear set comprises a second planetary carrier, a second planetary gear disposed on the second planetary carrier, and a second gear ring and a second sun gear that are engaged with the second planetary gear.

5. The electro-hydraulic hybrid-power driving system according to claim 4, wherein a first brake is disposed on an outer side of the second gear ring.

6. The electro-hydraulic hybrid-power driving system according to claim 4, wherein the second sun gear is coaxially connected to a first sun gear, and the second planetary gear is connected to a first planetary gear by using a first planetary carrier.

7. The electro-hydraulic hybrid-power driving system according to claim 4, wherein the second planetary carrier is fixedly connected to a fifth gear, the fifth gear is engaged with a sixth gear, and the sixth gear is fixedly connected to a wheel.

8. The electro-hydraulic hybrid-power driving system according to claim 1, wherein a manner in which the first motor is axially connected to the engine is one manner selected from manners of a direct axial connection, a connection via a gear, and a connection via a planet row.

9. The electro-hydraulic hybrid-power driving system according to claim 1, wherein a manner in which the second motor is axially connected to the first planetary gear set is one manner selected from manners of a direct axial connection, a connection via a gear, and a connection via a planet row.

10. The electro-hydraulic hybrid power system according to claim 1, wherein an outer diameter size of the first gear is greater than an outer diameter size of the second gear.

11. The electro-hydraulic hybrid power system according to claim 3, wherein an outer diameter size of the third gear is less than an outer diameter size of the fourth gear.

12. The electro-hydraulic hybrid power system according to claim 4, wherein an outer diameter size of the second sun gear is greater than an outer diameter size of the first sun gear.

13. The electro-hydraulic hybrid-power driving system according to claim 4, wherein an outer diameter size of the second planetary gear is less than an outer diameter size of the first planetary gear.

\* \* \* \* \*